(12) United States Patent
Cole et al.

(10) Patent No.: US 8,096,268 B2
(45) Date of Patent: Jan. 17, 2012

(54) MUNICIPAL SOLID WASTE FUEL STEAM GENERATOR WITH WATERWALL FURNACE PLATENS

(75) Inventors: Arthur W. Cole, Hampton, NH (US);
Robert Faia, Charlton City, MA (US);
Thomas Kelly, Brentwood, NH (US);
John Persson, Worcester, MA (US);
Frank J. Zone, Jr., Worcester, MA (US)

(73) Assignees: Riley Power Inc., Worcester, MA (US);
Wheelabrator Technologies, Inc., Hampton, NH (US)

( * ) Notice: Subject to any disclaimer, the term of this patent is extended or adjusted under 35 U.S.C. 154(b) by 976 days.

(21) Appl. No.: 11/961,654

(22) Filed: Dec. 20, 2007

(65) Prior Publication Data
US 2009/0084327 A1 Apr. 2, 2009

Related U.S. Application Data

(60) Provisional application No. 60/976,709, filed on Oct. 1, 2007.

(51) Int. Cl.
*F22B 13/12* (2006.01)
(52) U.S. Cl. ............................ 122/7 R; 122/1 C; 122/460
(58) Field of Classification Search .................. 122/1 B, 122/1 C, 7 R, 459, 460, 483, 235.12, 235.14, 122/235.33
See application file for complete search history.

(56) References Cited

U.S. PATENT DOCUMENTS

| | | | |
|---|---|---|---|
| 2,685,279 A | | 8/1954 | Caracristi |
| 2,754,807 A | | 7/1956 | Smith |
| 3,175,367 A | | 3/1965 | Gorzegno et al. |
| 3,368,534 A | | 2/1968 | Gorzegno et al. |
| 3,643,634 A | * | 2/1972 | Soh ................................ 122/483 |
| 4,178,881 A | * | 12/1979 | Pratt et al. ................. 122/235.12 |
| 4,353,207 A | | 10/1982 | Lee |
| 5,273,002 A | | 12/1993 | Balint et al. |
| 5,443,022 A | * | 8/1995 | Winkin et al. ................. 110/245 |
| 5,471,955 A | | 12/1995 | Dietz |
| 5,560,322 A | * | 10/1996 | Fitzgerald ....................... 122/64 |

(Continued)

FOREIGN PATENT DOCUMENTS

CA 1328787 C 4/1994

(Continued)

OTHER PUBLICATIONS

International Search Report dated Mar. 26, 2009 for PCT/US2008/077790.

(Continued)

*Primary Examiner* — Gregory A Wilson
(74) *Attorney, Agent, or Firm* — Edwards Wildman Palmer LLP; Joshua L. Jones

(57) ABSTRACT

A steam generator includes a furnace configured and adapted to generate a stream of furnace exit gases from the combustion of municipal solid waste fuel. At least one superheater is disposed within an upper portion of the furnace or backpass. The superheater is configured and adapted to superheat fluids within the superheater by facilitating heat transfer between fluids within the superheater and furnace exit gases outside the superheater. At least one waterwall furnace platen is disposed within the furnace upstream from the superheater, the waterwall furnace platen is configured and adapted to lower furnace exit gas temperature at the superheater by facilitating heat transfer between fluids within the waterwall furnace platen and furnace exit gases outside the waterwall furnace platen.

3 Claims, 4 Drawing Sheets

U.S. PATENT DOCUMENTS

| | | | |
|---|---|---|---|
| 5,822,991 A | 10/1998 | Pierzchala et al. | |
| 6,044,805 A | 4/2000 | Walker et al. | |
| 6,446,584 B1 | 9/2002 | Franke et al. | |
| 6,500,221 B2 * | 12/2002 | Walker et al. | 55/444 |
| 6,557,500 B1 | 5/2003 | Schroeder | |
| 7,434,543 B2 * | 10/2008 | Raukola et al. | 122/7 R |
| 7,587,994 B2 * | 9/2009 | Raukola et al. | 122/7 R |
| 7,640,750 B2 * | 1/2010 | Saviharju et al. | 60/653 |
| 2009/0194262 A1 * | 8/2009 | Roppo et al. | 165/134.1 |

FOREIGN PATENT DOCUMENTS

| | | |
|---|---|---|
| CA | 2507821 | 6/2004 |
| CN | 2510728 Y | 9/2002 |
| CN | 1696569 A | 11/2005 |
| EP | 1188986 A2 | 3/2002 |
| FR | 2578957 A1 | 9/1986 |
| GB | 527315 A | 10/1940 |
| KR | 20-0167978 | 11/1999 |
| KR | 10-2001-0112243 | 12/2001 |
| KR | 10-2004-0073453 | 8/2004 |
| KR | 10-2005-0086899 | 8/2005 |
| WO | WO-98/27384 A1 | 6/1998 |
| WO | WO-2004/065873 A1 | 8/2004 |

OTHER PUBLICATIONS

Chinese Office Action dated Jun. 9, 2011, and English translation thereof, of issued on corresponding Chinese Patent Application No. 200880109906.

Supplementary European Search Report dated Aug. 1, 2011 issued on European Patent Application No. EP 08 83 6286.

* cited by examiner

MUNICIPAL SOLID WASTE FUEL STEAM GENERATOR WITH WATERWALL FURNACE PLATENS

CROSS-REFERENCE TO RELATED APPLICATION

This application claims benefit of priority from U.S. Provisional Application Ser. No. 60/976,709, filed Oct. 1, 2007, which is incorporated by reference herein in its entirety.

BACKGROUND OF THE INVENTION

1. Field of the Invention

The present invention relates to a municipal solid waste fuel steam generator. Particularly, the present invention is directed to a municipal solid waste fuel steam generator having waterwall furnace platens.

2. Description of Related Art

Waste-to-energy or Energy-from-waste plants generate high-energy steam in boilers by combusting waste materials. Municipal solid waste fuel steam generators use solid municipal waste, such as refuse, as fuel to generate steam. The steam is commonly used to drive high-pressure steam turbines in order to generate electricity or provide steam to a steam user "host" or district heating system. When operated in an environmentally friendly way, solid waste fuel steam generators can solve two problems at the same time: they benefit the environment by reducing the demand on landfills for disposal of solid waste and they generate much needed power.

Many steam generators, including those adapted to burn fossil fuels, municipal solid waste, and other fuels, include a superheater downstream from the combustion zone. Steam within the superheater reaches a superheated state as the passing combustion gases release heat into the superheater. This superheated steam is typically used to power high-pressure turbines. The material demands on the superheater in these extreme temperatures are great. One way to increase the life of superheaters in coal powered steam generators is to include a bank of waterwall furnace platens upstream from the superheater. The waterwall furnace platens circulate relatively cool fluids, and thereby absorb some of the heat from the combustion gases before the hot gases reach the superheater. This has the effect of lowering the furnace gas exit temperature in front of the superheater, extending its useable life. This arrangement ultimately reduces corrosion rate and extends the useful life of superheaters significantly and can be operated in a way that does not substantially impact overall thermal efficiency.

In municipal solid waste fuel steam generators, however, the combustion gases at the superheater are much more corrosive than in steam generators using coal and other fuels. This leads to the need for frequent repair or replacement of the superheater, which results in downtime. The highly corrosive environment has prevented use of waterwall furnace platens in steam generators using municipal solid waste fuel. Instead, other approaches have been made to protect the superheater, such as placing costly high alloy tubes and/or shields in the path of the combustion gases or making the overall height of the furnace greater in order to reduce the furnace flue gas exit temperature. However, in order to reduce corrosion of superheaters in existing facilities, it is impractical and extremely difficult to increase the size of the furnace adequately due to space limitations. And shielding the superheater does not reduce the furnace flue gas exit temperatures in the vicinity of the superheater.

Such conventional methods and systems have generally been considered satisfactory for their intended purpose. However, there still remains a continued need in the art for a waterwall furnace platen suitable for protecting superheaters within municipal solid waste fuel steam generators. There also remains a need in the art for a waterwall furnace platen for use in municipal solid waste fuel steam generators that is durable and that is easy and cost effective to make and use. The present invention provides a solution for these problems.

SUMMARY OF THE INVENTION

The purpose and advantages of the present invention will be set forth in and become apparent from the description that follows. Additional advantages of the invention will be realized and attained by the methods and systems particularly pointed out in the written description and claims hereof, as well as from the appended drawings.

To achieve these and other advantages and in accordance with the purpose of the invention, as embodied herein, the invention includes a steam generator including a furnace configured and adapted to generate a stream of combustion gases from combustion of municipal solid waste fuel. The steam generator also includes at least one superheater disposed within an upper portion of the furnace, downstream of a combustion zone, or proximate a backpass of the furnace. The superheater is configured and adapted to superheat fluids within the superheater by facilitating heat transfer between fluids within the superheater and furnace exit gases outside the superheater. At least one waterwall furnace platen is disposed within the furnace upstream from the superheater. The waterwall furnace platen is configured and adapted to lower furnace exit gas temperature at the superheater by facilitating heat transfer between fluids within the waterwall furnace platen and furnace exit gases outside the waterwall furnace platen.

In accordance with another aspect of the invention, at least one superheater and waterwall furnace platen are preferably in fluid communication with each other as part of a thermal hydraulic circuit. In another preferred embodiment, the waterwall furnace platen(s) are positioned within the furnace to allow maintenance access to the superheater. The waterwall furnace platen(s) can further include mechanical means operably connected to the waterwall furnace platen(s) to vibrate during operation and reduce residue build-up on exterior surfaces of the platen(s). It is also contemplated that the waterwall furnace platen(s) can include a piping header expansion loop configured and adapted to accommodate for thermal expansion and flexing of external supply headers.

The invention also includes a waterwall furnace platen for use in a municipal solid waste fuel steam generator. The waterwall furnace platen preferably includes a bank of tubes configured with membrane construction and adapted to facilitate heat transfer between a fluid circulating within the tubes and a stream of furnace exit gases passing outside the tubes. The bank of tubes includes a corrosion resistant material.

The corrosion resistant material may include an overlay disposed on an exterior surface of the bank of tubes. The overlay preferably includes an Inconel® alloy. The overlay can include Inconel® 625. In a preferred embodiment, the waterwall furnace platen can be configured and adapted to be positioned within the furnace to allow maintenance access to the superheater. It is also the intent of this invention to place the waterwall furnace platen away from the superheater, not directly in front as typical waterwall screens are placed. It is important that the waterwall furnace platens are positioned several feet away especially when super heater performance is dependent on radiant beat and luminous light from the furnace combustion process.

The waterwall furnace platen is intended to be suitable for use in new steam generation plants. A steam generation plant in accordance with the invention includes a furnace configured and adapted to generate a stream of combustion gases from combustion of municipal solid waste fuel. At least one superheater is disposed within or proximate an upper portion or backpass of the furnace. The superheater is configured and adapted to facilitate heat transfer between fluids within the superheater and furnace exit gases outside the superheater. At least one waterwall furnace platen is disposed within the furnace upstream from the superheater. The waterwall furnace platen is configured and adapted to lower furnace exit gas temperature at the superheater by facilitating heat transfer between fluids within the waterwall furnace platen and furnace exit gases outside the superheater and waterwall furnace platen. A steam powered system is in fluid communication with the superheater.

It is contemplated that the steam powered system can include a high-pressure turbine. It is also contemplated that the steam powered system can include a steam host or district heating system. The at least one superheater and waterwall furnace platen can be in fluid communication with each other as part of a thermal hydraulic circuit.

The invention further includes a system for generating steam in a thermal hydraulic circuit of a municipal solid waste fuel steam generator. The system includes at least one superheater configured and adapted to facilitate heat transfer between fluids within the superheater and furnace exit gases outside the superheater. A drum is in fluid communication with the superheater for separating vapor and liquid to supply saturated steam to the superheater. At least one waterwall furnace platen is in fluid communication with the drum. The waterwall furnace platen is configured and adapted to lower furnace exit gas temperature at the superheater by facilitating heat transfer between fluids within the waterwall furnace platen and furnace exit gases outside the superheater. The waterwall furnace platen includes a corrosion resistant overlay disposed on an outer surface of the waterwall furnace platen.

It is further contemplated that the invention also includes a method of reducing corrosion of superheaters in municipal solid waste fuel steam generators. The method includes providing a waterwall furnace platen upstream of a superheater, wherein the waterwall furnace platen is configured and adapted to lower furnace exit gas temperature at the superheater by facilitating heat transfer between fluids within the waterwall furnace platen and furnace exit gases outside the waterwall furnace platen. The method also includes circulating a fluid through a bank of tubes in the waterwall furnace platen to cool a stream of furnace exit gases outside the superheater.

A method of retrofitting a municipal solid waste fuel steam generator to reduce corrosion of a superheater is also contemplated in accordance with the invention. The method includes providing a waterwall furnace platen configured and adapted to lower furnace exit gas temperature at a superheater in a municipal solid waste fuel steam generator by facilitating heat transfer between fluids within the waterwall furnace platen and furnace exit gases outside the superheater. An access is opened through the upper furnace roof of the steam generator and at least one furnace wall. The waterwall furnace platen is mounted through the upper furnace roof and at least one furnace wall. The method also includes operably connecting the waterwall furnace platen to a drum of the steam generator.

The method of retrofitting can further include measuring temperatures within an existing municipal solid waste fuel steam generator, wherein the step of providing a waterwall furnace platen includes configuring the waterwall furnace platen to reduce corrosion of the superheater based on the temperatures measured in the existing municipal solid waste fuel steam generator.

There is also a method of enhancing $NO_x$ control in a municipal solid waste fuel steam generator, in accordance with the invention. The method includes providing a furnace configured and adapted to generate a stream of furnace exit gas from combustion of municipal solid waste fuel, the furnace having at least one superheater disposed proximate a backpass, or downstream of a combustion zone, and at least one waterwall furnace platen disposed within the furnace upstream from the superheater. The furnace is operated to generate steam from the super heater. The method further includes enhancing $NO_x$ reduction by circulating fluids through the at least one waterwall furnace platen to lower furnace exit gas temperature at the superheater.

A method of lowering reactant requirements for selective non-catalytic reduction of $NO_x$ (SNCR) in a municipal solid waste fuel steam generator is also contemplated as being within the scope of the invention. This method includes providing a furnace configured and adapted to generate a stream of furnace exit gas from combustion of municipal solid waste fuel that provides an enhanced and stable temperature environment within the furnace for SNCR, the furnace having at least one superheater disposed proximate a backpass, or downstream of a combustion zone, and at least one waterwall furnace platen disposed within the furnace upstream from the superheater. A selective non-catalytic reduction system is provided, operably connected to reduce $NO_x$ emissions from furnace exit gas. The method includes operating the furnace to generate steam from the super heater and operating the selective non-catalytic reduction system by reacting the furnace exit gas with a required amount of reactant to reduce $NO_x$ emissions to within acceptable limits. The method also includes the step of reducing the required amount of reactant by circulating fluids through the at least one waterwall furnace platen to lower furnace exit gas temperature at the superheater. It is contemplated that the reactant can be urea, ammonia, or any other suitable reactant. It is also possible to use the method with selective catalytic reduction systems (SCR).

It is to be understood that both the foregoing general description and the following detailed description are exemplary and are intended to provide further explanation of the invention claimed. The accompanying drawings, which are incorporated in and constitute part of this specification, are included to illustrate and provide a further understanding of the method and system of the invention. Together with the description, the drawings serve to explain the principles of the invention.

DETAILED DESCRIPTION OF THE PREFERRED EMBODIMENT

Reference will now be made in detail to the present preferred embodiments of the invention, examples of which are illustrated in the accompanying drawings. The method and corresponding steps of the invention will be described in conjunction with the detailed description of the system. The devices and methods presented herein may be used for reducing the corrosion of superheaters in municipal solid waste fuel steam generators. The present invention is well suited to decrease furnace exit gas temperature and improve furnace gas flow distribution.

Figure 1:
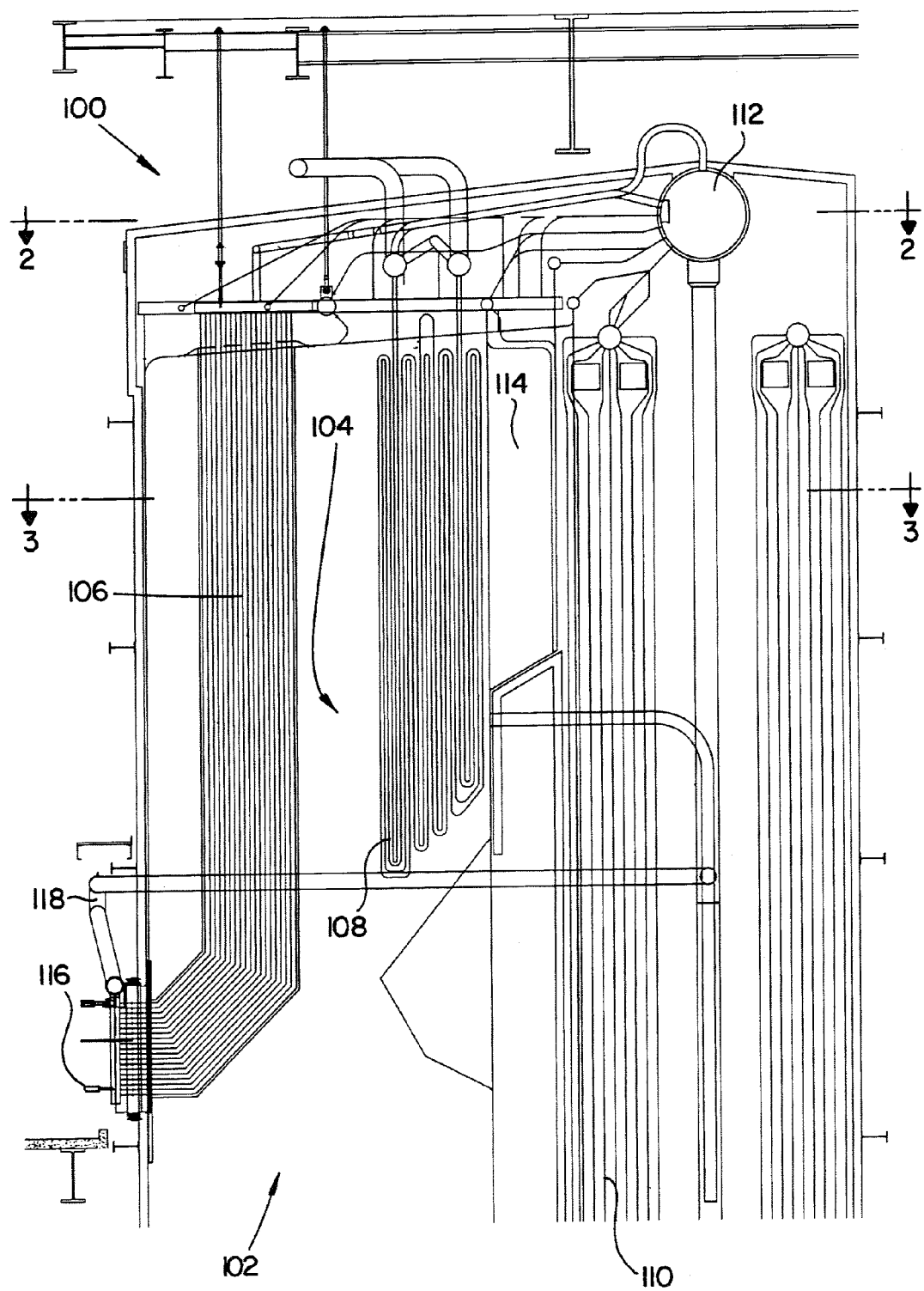
FIG. 1 is a cross-sectional side elevation view of a portion of a first representative embodiment of a steam generator in accordance with the present invention, showing the furnace, waterwall furnace platens, superheater, and boiler bank.

Referring to the Figures generally, wherein like numerals designate the same element throughout the several drawings, FIG. 1 shows a cross-sectional side elevation view of an exemplary embodiment of a steam generator for generating steam from combusting municipal solid waste as fuel in accordance with the invention, which is designated 100. Other embodiments of a steam generator in accordance with the invention, or aspects thereof, are provided in FIGS. 2-4, as will be described.

In accordance with the invention, a steam generator includes a furnace configured and adapted to generate a stream of combustion gases from combustion of municipal solid waste fuel. At least one superheater is disposed within an upper portion of the furnace, downstream of a combustion zone, or proximate a backpass thereof. Those skilled in the art will readily appreciate other suitable locations for the superheater. The superheater is configured and adapted to superheat fluids within the superheater by facilitating heat transfer between fluids within the superheater and furnace exit gases outside the superheater. At least one waterwall furnace platen is disposed within the furnace upstream from the superheater. The waterwall furnace platen is configured and adapted to lower furnace exit gas temperature at the superheater by facilitating heat transfer between fluids within the waterwall furnace platen and furnace exit gases outside the waterwall furnace platen.

For purposes of illustration and not limitation, as embodied herein and as depicted in FIG. 1, a municipal solid waste fuel furnace 102 generates a stream of combustion gases by combustion of solid waste as fuel. The solid waste can be refuse or other waste material, for example. The combustion gas flows upward into upper furnace 104, where it is diverted through superheater 108.

Downstream from the backpass 114, boiler banks 110 include tubes that contain a water/steam mixture. Water entering boiler banks 110 is converted into saturated steam as passing combustion gases exchange heat with the water through the tube walls of boiler banks 110. The saturated steam is passed through drum 112 and into superheater 108. Superheater 108 is located upstream from boiler banks 110, and is thus located in a hotter portion of upper furnace 104. Saturated steam entering superheater 108 is superheated by exchanging heat through the tube walls of superheater 108 with combustion gases exiting the furnace. The superheated steam can then be used as a power source, for example by passing through a high-pressure steam turbine, or by being distributed to a steam host or district heating system.

The combustion gases within upper furnace 104 are particularly corrosive because of the municipal solid waste used as fuel. In typical municipal solid waste fuel steam generators, the corrosive environment can quickly corrode the metallic tubes of the superheater. However, superheater 108 provided herein experiences significantly less corrosion than in known municipal solid waste steam generators. This decrease in corrosion is attributable to waterwall furnace platens 106, which are located upstream from superheater 108. Waterwall furnace platens 106 include tubes with flowing water. As combustion gases pass outside waterwall furnace platens 106, some of the heat is exchanged with the water in the tubes of waterwall furnace platens 106. This preheats the water, and can even convert some or all of the water into steam, which is passed through drum 112. Simultaneously, the temperature of the furnace exit gases is lowered so that the exterior temperatures of superheater 108 are significantly lower than they would be without waterwall furnace platens 106. The lower temperatures around the tubes of superheater 108 substantially lower the corrosive action of the combustion gases on superheater 108, which significantly increases the useable life of superheater 108.

Waterwall platens 106 preferably include a membrane between each pair of adjacent tubes. The membrane is preferably steel, however, any suitable material can be used. The membranes lend extra rigidity to platen 106 without significant negative effects on the flow or heat transfer characteristics of platen 106.

Waterwall furnace platens 106 can be protected against the corrosive environment of upper furnace 104 by using corrosion resistant materials. It is possible to use a protective overlay on the tubes of waterwall furnace platens 106 to reduce corrosion wear. Nickel alloys are particularly well suited for use as overlays in the application described herein. Commercial alloys that can be used in overlays for waterwall furnace platen 106 include Inconel® alloys available from Special Metals Corporation, Huntington, W. Va., USA. Inconel® 625 is a particularly well-suited overlay material. However, those skilled in the art will readily appreciate that any other suitable overlay material can be used without departing from the spirit and scope of the invention. Moreover, those skilled in the art will readily appreciate that the tube banks of waterwall furnace platens 106 can be made entirely from corrosion resistant materials without departing from the spirit and scope of the invention.

Waterwall furnace platens 106, superheater 108, and boiler banks 110 are all parts of a single thermal hydraulic circuit. Liquid water is circulated naturally, or by any other suitable means, through waterwall furnace platens 106, where heat is added to the water as described above. Water also passes through boiler banks 110, where heat is added to convert liquid water into saturated steam. Steam and/or water from waterwall furnace platens 106 and boiler banks 110 is mixed in drum 112, which separates steam from liquid water and passes the steam into superheater 108 in a manner known in the art. In superheater 108, additional heat is added to superheat the steam, as described above. The steam is then used, for example, in a high-pressure steam turbine to generate mechanical power, or for distribution to a steam host or district heating system as described above. The turbine or heating system depletes substantial amounts of energy from the steam, which is then condensed back into liquid water. The liquid water is pumped or otherwise circulated back into boiler drum 112, waterwall furnace platens 106 and boiler bank 110 to continue the cycle.

While steam generator 100 has been described above as including a single closed thermal hydraulic circuit, those skilled in the art will readily appreciate that it is possible for waterwall furnace platens 106 to be part of a separate circuit. It is also possible for steam generator 100 to operate as an open circuit rather than a closed circuit, in which case liquid water could be supplied from an external source to waterwall furnace platens 106 and/or boiler banks 110, and could be returned to the environment after use in the turbine or heating system. Furthermore, while waterwall furnace platens 106 and boiler bank 110 have been described above as operating in parallel, those skilled in the art will readily appreciate how to operate them in series. Those skilled in the art will readily appreciate that these and other suitable variations on the thermal hydraulic circuit can be practiced without departing from the spirit and scope of the invention.

Figure 2:
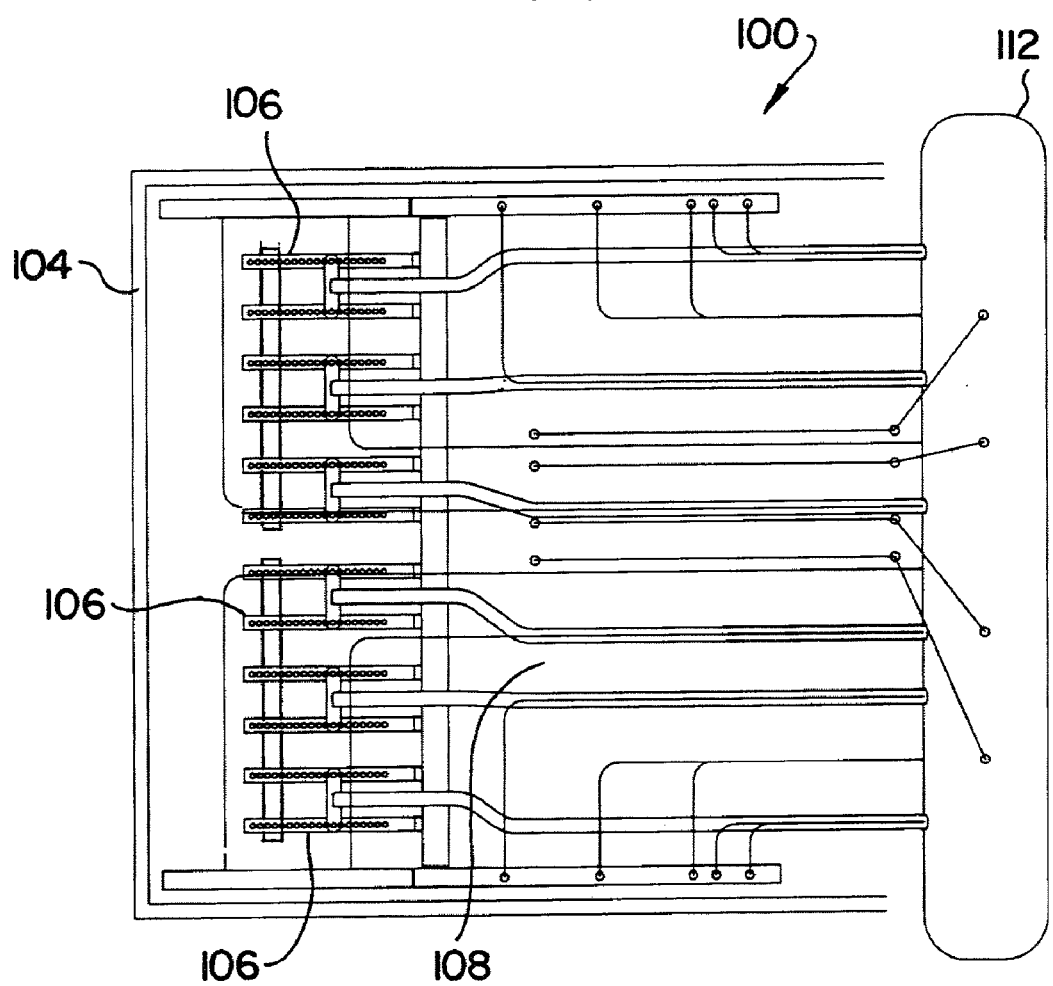
FIG. 2 is a cross-sectional plan view of the steam generator of FIG. 1 in accordance with the present invention, showing the location of the waterwall furnace platens and superheater with respect to the drum.
Figure 3:
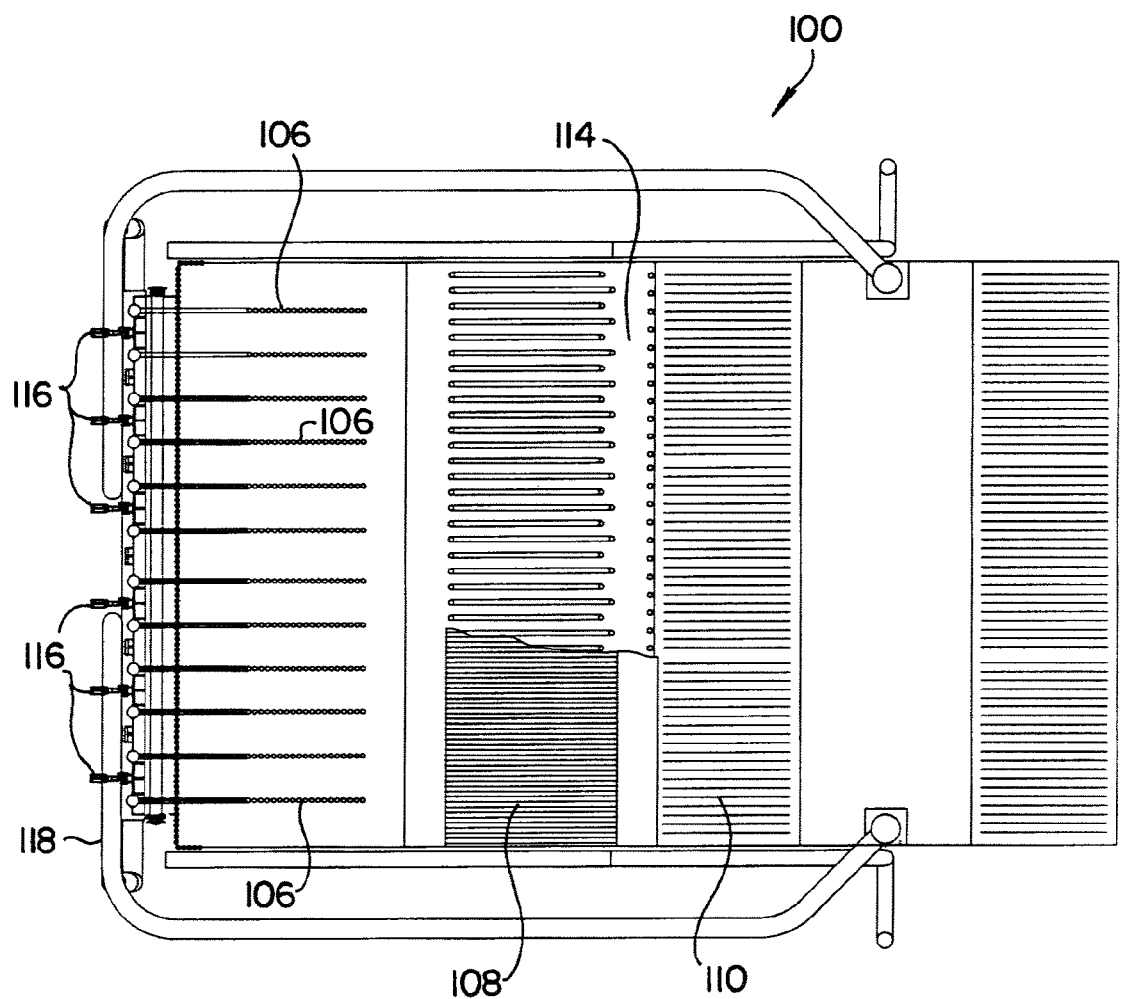
FIG. 3 is a cross-sectional plan view of the steam generator of FIG. 1 in accordance with the present invention, showing the location of the waterwall furnace platens, superheater, and boiler banks with respect to the boiler back pass.

FIGS. 2 and 3 show plan views of different cross-sections of steam generator 100. FIG. 2 shows a cross-section including drum 112. FIG. 3 shows a cross-section through back pass 114. Both views show the spacing between waterwall furnace platens 106. This configuration allows for maintenance access to superheater 108 and waterwall furnace platens 106 without requiring removal of waterwall furnace platens 106, for example through the space between superheater 108 and waterwall furnace platens 106. Those skilled in the art will readily appreciate that any suitable configuration can be used to allow access to the superheater without departing from the spirit and scope of the invention.

Figure 4:
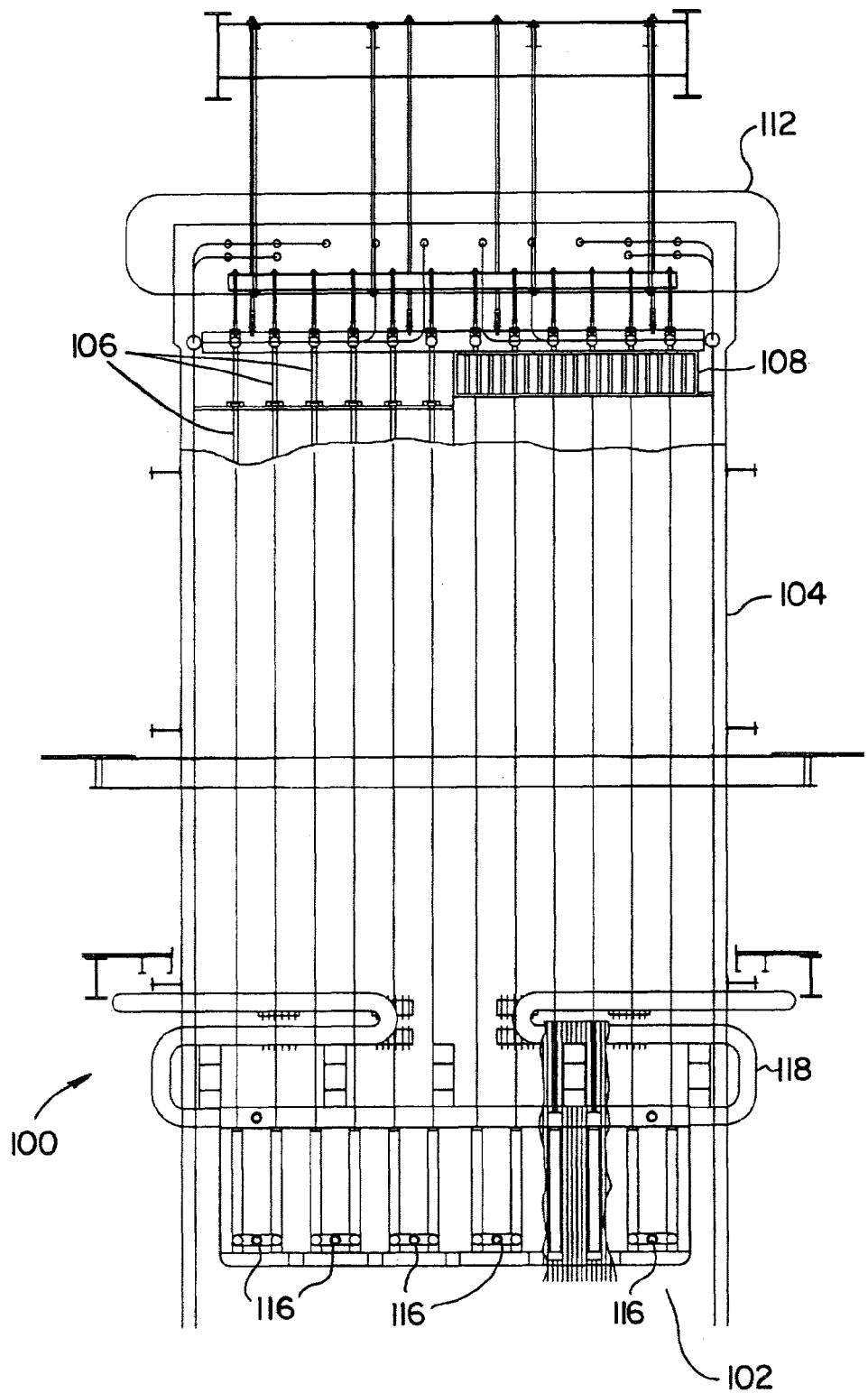
FIG. 4 is a cross-sectional front elevation view of the steam generator of FIG. 1 in accordance with the present invention, showing bends in the piping for accommodating thermal expansion and compression.

FIG. 4 shows a front elevation view of steam generator 100. Waterwall furnace platens 106 are connected to a common supply header pipe arrangement 118, which includes tube bends, and header piping expansion loops for each waterwall furnace platen to accommodate thermal expansion and contraction within waterwall furnace platen 106. Those skilled in the art will readily appreciate that any suitable configuration for accommodating thermal expansion and contraction can be used without departing from the spirit and scope of the invention.

Additionally, mechanical devices 116 can be placed on exterior surfaces of waterwall furnace platen 106. In operation, vibrating wrappers or other suitable devices can remove or prevent formation of residue build-up on exterior surfaces of waterwall furnace platens 106. Those skilled in the art will readily appreciate that vibration means are optional and that any suitable mechanical or vibration means can be used without departing from the spirit and scope of the invention.

In further accordance with the invention, a method is provided for reducing corrosion of superheaters in municipal solid waste fuel steam generators. The method includes providing a waterwall furnace platen upstream of a superheater. The waterwall furnace platen is configured and adapted to lower furnace exit gas temperature at the superheater by facilitating heat transfer between fluids within the waterwall furnace platen and furnace exit gases outside the superheater. The method also includes circulating a fluid through a bank of tubes in the waterwall furnace platen to cool a stream of furnace exit gases outside the tubes.

For purposes of illustration and not limitation, as embodied herein and as depicted in FIGS. 1-4, it is possible to reduce corrosion of superheater tubes in municipal solid waste fuel steam generators as follows. A waterwall furnace platen (e.g. 106) is provided upstream of a superheater (e.g. 108) in an upper furnace (e.g. 104) of a steam generator (e.g. 100) that produces a stream of combustion gases from combustion of municipal solid waste. The waterwall furnace platen is configured and adapted to lower furnace exit gas temperatures, as described above. The method further includes circulating a fluid through a bank of tubes in the waterwall furnace platen to cool the stream of furnace exit gases passing outside the waterwall furnace platen. Thus when the furnace exit gases reach the superheater, the temperature is lowered and the corrosive action on the outer surface of the superheater is reduced significantly.

The invention also includes a method of retrofitting a municipal solid waste fuel steam generator to reduce corrosion of a superheater. The method includes providing a waterwall furnace platen configured and adapted to lower furnace exit gas temperature at a superheater in a municipal solid waste fuel steam generator by facilitating heat transfer between fluids within the waterwall furnace platen and combustion gases exiting the furnace outside the superheater. The method further includes opening an access through the roof of the upper furnace of the steam generator and at least one furnace wall, mounting the waterwall furnace platen through the upper furnace roof and furnace wall, and operably connecting the waterwall furnace platen to a drum of the steam generator.

For purposes of illustration and not limitation, and as shown in FIGS. 1-4, it is possible to retrofit an existing municipal solid waste fuel steam generator with at least one waterwall furnace platen (e.g. platen 106) in order to reduce corrosion of the superheater. The size and configuration of existing municipal solid waste fuel steam generators varies from plant to plant, thus it is often desirable to measure operating temperatures within the existing steam generator to provide data useful in configuring waterwall furnace platens for use in retrofitting. Those skilled in the art will readily appreciate how to take such measurements and apply them to configure a waterwall furnace platen according to the invention.

Once the waterwall furnace platen is prepared, an access must be opened on the upper furnace roof and at least one furnace wall location to allow the waterwall furnace platen to be mounted in the upper furnace in a location suitable to reduce corrosion on the superheater, as described above. The fluid passages of the waterwall furnace platen must be connected to a thermal/hydraulic circuit of the steam generator. Typically this involves connecting the waterwall furnace platen to a drum in the upper furnace, as described above. Those skilled in the art will readily appreciate other suitable variations of the retrofitting process that can be practiced based on individual steam generator designs without departing from the spirit and scope of the invention.

The circuit described above reduces corrosion of the superheater 108 without substantially impacting thermal efficiency of steam generator 100 when compared with known municipal solid waste fuel steam generators. Moreover, the configuration of steam generator 100 with waterwall furnace platens 106 provides reduced furnace exit gas temperature and improved furnace exit gas flow distribution over known municipal solid waste fuel steam generators.

It has been mentioned above that one traditional approach to the problem of corrosion of superheaters in municipal solid waste fuel steam generators is to simply increase the height of the upper furnace to reduce temperatures at the superheater. Steam generator 100 can be used in lieu of increasing the furnace height. Thus if an existing furnace is retrofitted according to the invention, a significant saving of space results. In cases where increasing the size of the furnace is not possible or practical due to space limitations, retrofitting the furnace according to the invention may nonetheless be possible.

In addition to the intended result of reducing superheater corrosion, the invention has provided multiple unexpected beneficial results. Waterwall furnace platens according to the invention have been proven to improve thermal performance of the furnace. In a municipal solid waste fuel furnace using urea for $NO_x$ reduction (by methods such as selective non-catalytic reduction (SNCR), as is known in the art), use of waterwall furnace platens has reduced the urea requirement by up to 40% without detriment to the $NO_x$ emissions. Those skilled in the art will appreciate that this amount varies from site to site. The invention can also be used beneficially in systems with selective catalytic reduction (SCR). Moreover, those skilled in the art will also appreciate that with the reduced requirement for urea, additional urea above the requirement can be used to further reduce $NO_x$ below required levels.

An additional unexpected result is that municipal solid waste fuel steam generation units using waterwall furnace platens according to the invention can operate for up to 33% longer than the ordinary period between cleanings, which varies from site to site. This is a substantial benefit, as the cleaning process for municipal solid waste fuel steam generators is expensive and involved due to the variety of materials combusted. Additionally, cleaning of the steam generator has proven to be easier and up to 50% faster as a result of using waterwall furnace platens in accordance with the invention. The ease in cleaning is due to changes in the make up of the ash and residue due to the presence of the waterwall furnace platens.

The methods and systems of the present invention, as described above and shown in the drawings, provide for a municipal solid waste fuel steam generator with reduced corrosive action on the superheater. It will be apparent to those skilled in the art that various modifications and variations can be made in the device and method of the present invention without departing from the spirit or scope of the invention. Thus, it is intended that the present invention include modifications and variations that are within the scope of the appended claims and their equivalents.

What is claimed is:

1. A method of lowering reactant requirements for selective non-catalytic reduction of $NO_x$ in a municipal solid waste fuel steam generator, comprising steps of:
   a) providing a furnace configured and adapted to generate a stream of furnace exit gas from combustion of municipal solid waste fuel, the furnace having at least one superheater disposed downstream of a combustion zone of the furnace, and at least one waterwall furnace platen disposed within the furnace upstream from the superheater;
   b) providing a selective non-catalytic reduction system operably connected to reduce $NO_x$ emissions from furnace exit gas;
   c) operating the furnace to generate steam from the superheater;
   d) operating the selective non-catalytic reduction system by reacting the furnace exit gas with a required amount of reactant to enhance $NO_x$ control to within acceptable limits; and
   e) reducing the required amount of reactant by circulating fluids through the at least one waterwall furnace platen to lower furnace exit gas temperature at the superheater.

2. A method of lowering reactant requirements, as recited in claim 1, wherein the reactant includes urea.

3. A method of lowering reactant requirements, as recited in claim 1, wherein the reactant includes ammonia.

\* \* \* \* \*